United States Patent
Ali

(10) Patent No.: US 8,425,191 B2
(45) Date of Patent: Apr. 23, 2013

(54) PROPFAN ASSEMBLY

(75) Inventor: Amr Ali, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1280 days.

(21) Appl. No.: 12/130,054

(22) Filed: May 30, 2008

(65) Prior Publication Data

US 2009/0297357 A1     Dec. 3, 2009

(51) Int. Cl.
*B64C 11/24*    (2006.01)

(52) U.S. Cl.
USPC ........................................................ 416/90 R

(58) Field of Classification Search ................. 41/146 R, 41/229 R, 231 R, 231 B, 500
See application file for complete search history.

(56) References Cited

U.S. PATENT DOCUMENTS

| | | |
|---|---|---|
| 1,946,129 A | 2/1934 | Cebulski |
| 2,333,555 A | 10/1941 | Prucha |
| 2,340,417 A | 2/1944 | Ellett |
| 3,779,338 A | 12/1973 | Hayden et al. |
| 3,820,628 A * | 6/1974 | Hanson .......................... 181/214 |
| 4,168,939 A | 9/1979 | Schmitz et al. |
| 4,358,246 A | 11/1982 | Hanson et al. |
| 4,370,097 A * | 1/1983 | Hanson et al. ................. 416/228 |
| 4,519,746 A | 5/1985 | Wainauski et al. |
| 4,534,526 A | 8/1985 | Metzger et al. |
| 3,044,559 A | 7/1992 | Chajmik |
| 5,613,649 A | 3/1997 | Schlinker et al. |
| 5,961,067 A | 10/1999 | Hall et al. |
| 6,139,259 A | 10/2000 | Ho et al. |
| 6,671,590 B1 | 12/2003 | Betzina et al. |
| 7,018,172 B2 * | 3/2006 | Prasad et al. ................... 415/119 |
| 2008/0080977 A1 * | 4/2008 | Bonnet ..................... 416/229 A |

* cited by examiner

*Primary Examiner* — Ninh H Nguyen
*Assistant Examiner* — Adam W Brown
(74) *Attorney, Agent, or Firm* — Carlson, Gaskey & Olds, P.C.

(57) ABSTRACT

A propfan assembly includes a plurality of blades that each include an internal cavity containing a noise attenuation structure. Acoustic energy is communicated to the internal cavity through a plurality of openings in the blade surfaces. The cavities include features for attenuating noise energy to reduce generation of noise emitted from the propfan assembly.

11 Claims, 2 Drawing Sheets

PROPFAN ASSEMBLY

BACKGROUND OF THE INVENTION

This invention generally relates to a propfan assembly. More particularly, this invention relates to a propeller blade for a propfan assembly that includes noise attenuating features.

A gas turbofan engine includes fan blades that are disposed within a nacelle housing. The nacelle housing includes noise attenuating features to quiet select frequencies of noise generated by the rotating fan blades. A propfan includes blades that are not disposed within a duct and can provide performance improvements over ducted fan blades. However, unducted propfan blades can be noisy. Without surrounding nacelle mounted noise attenuation structures and features; noise generated by the prop-fan can be greater than is desired.

Accordingly, it is desirable to design and develop a propfan assembly with reduced noise emissions.

SUMMARY OF THE INVENTION

An example propfan assembly includes a plurality of blades that each include an internal cavity containing a noise attenuation structure. Acoustic energy is communicated to the internal cavity through a plurality of openings in the blade surfaces.

The example blades for the propfan assembly each include a plurality of openings on either the suction side, pressure side or both sides to communicate acoustic energy with cavities within each blade. The cavities include features for attenuating noise energy.

Accordingly, the example propfan assembly provides reduced noise emissions without sacrifice of performance improvements.

These and other features of the present invention can be best understood from the following specification and drawings, the following of which is a brief description.

DETAILED DESCRIPTION OF THE PREFERRED EMBODIMENT

Figure 1:
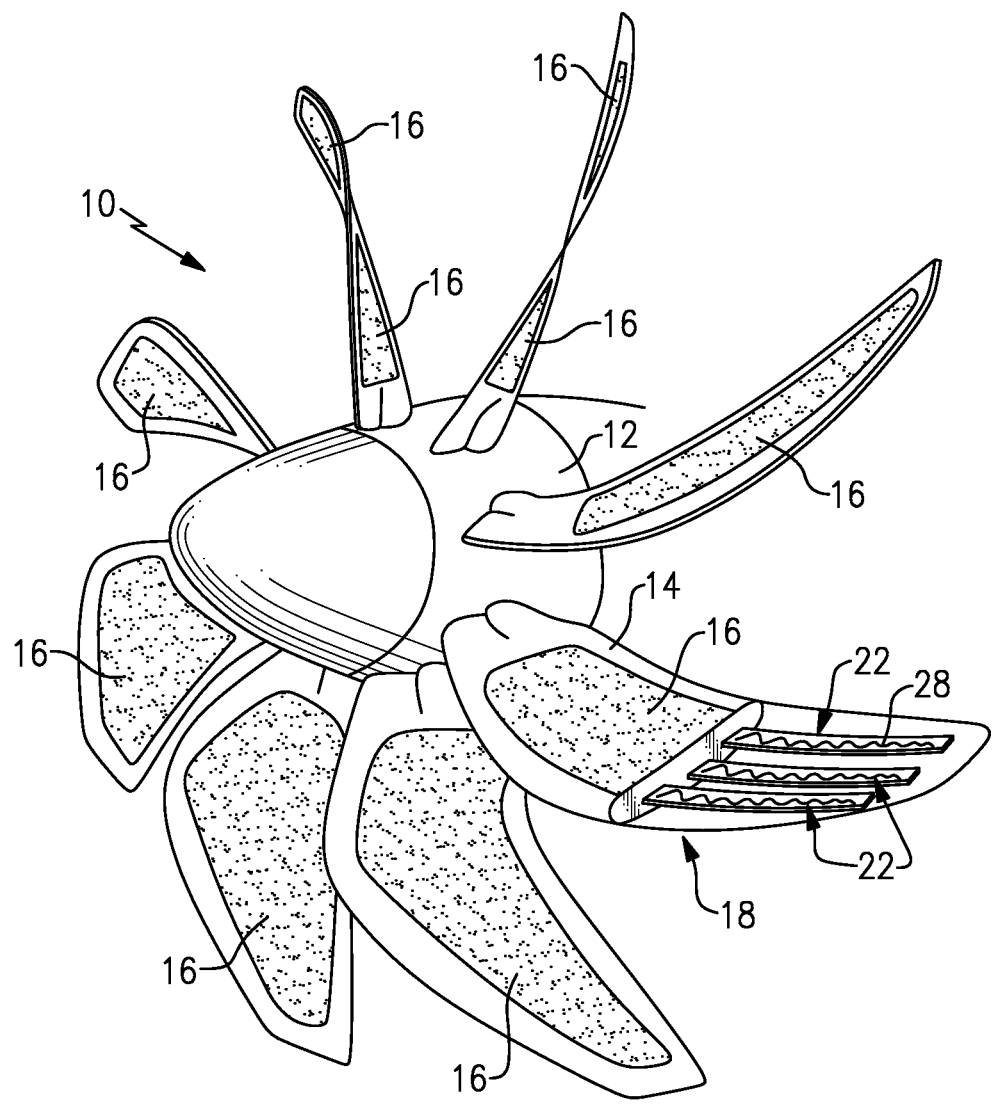
FIG. 1 is a view of an example propfan assembly.

Referring to FIG. 1, a propfan assembly 10 includes a hub 12 and a plurality of blades 14 attached to the hub 12. The hub 12 and blades 14 rotate as one assembly. The propfan assembly 10 is only one example of a propeller assembly. It is within the contemplation of this invention that any propeller assembly and configuration would benefit from application of the disclosed noise attenuation features.

Each of the plurality of blades 14 includes a plurality of small openings 16 that are schematically shown as the gray areas. The openings 16 communicate noise energy to an internal cavity 22 containing a noise attenuation structure 28. Noise energy communicated to the internal cavity 22 is dissipated to reduce the overall acoustic signature emitted by the propfan assembly 10. The example blades 14 include a plurality of cavities 22 that each include a noise attenuation structure 28.

Figure 2:
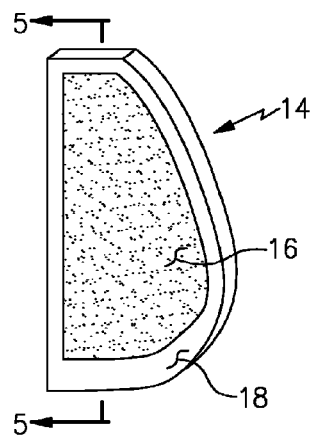
FIG. 2 is a schematic view of a pressure side of an example rotor blade.
Figure 3:
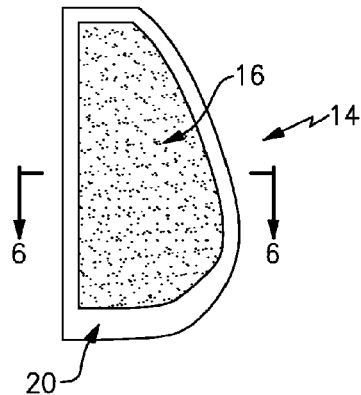
FIG. 3 is a schematic view of a suction side of the example rotor blade.

Referring to FIGS. 2 and 3, a single blade 14 is illustrated in an untwisted simplified schematic representation. The plurality of openings 16 communicate acoustic energy into the cavities 22 but are of a size that does not interfere with airflow over each of the pressure and suction sides 18, 20. The example openings 16 are disposed on both the suction and pressure sides 18, 20 of each of the blades. However, the openings 16 can be disposed on only one of the suction and pressure sides 18, 20. The openings 16 cover a portion of the blade sides 18, 20 that overlie portions of the cavities 22, disposed within each of the blades 14.

Figure 4:
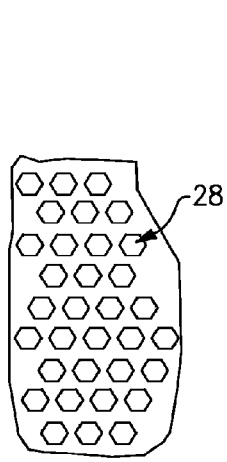
FIG. 4 is a schematic view of a noise attenuation structure disposed within the example rotor blade.

Referring to FIG. 4, the example noise attenuation structure 28 comprises a honeycomb structure that dissipates acoustic energy. The honeycomb structure is orientated such that at least one of the plurality of openings is in communication with each individual cell. The example honeycomb structure can be a separate structure that is installed within each of the cavities 22, or a integral structure of the cavity 22 itself. Further, although a honeycomb noise attenuation structure is disclosed, other noise attenuation structures that dissipate and absorb acoustic energy could also be utilized.

Figure 5:
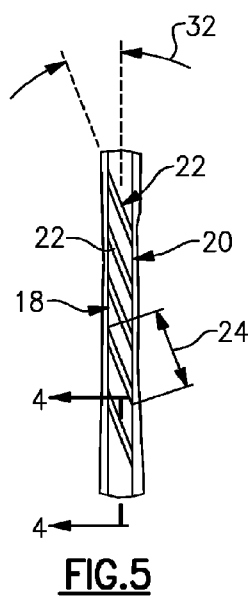
FIG. 5 is a schematic cross-section of an example rotor blade.
Figure 6:
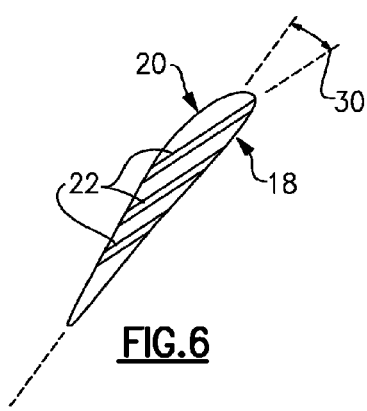
FIG. 6 is a cross-sectional view of the example rotor blade.

Referring to FIGS. 5 and 6, a single blade 14 includes a plurality of cavities 22. The cavities 22 are of a defined length 24. The length 24 is defined to correspond with the frequency of noise desired to be reduced. Noise generated from the propfan assembly 10 is often in a low frequency range requiring long cavities to absorb and attenuate the acoustic energy as desired. The shape of the blade 14 may require a specific orientation of the cavity 22 so that the desired length corresponding to the desired frequency can be installed. This may require that each cavity be uniquely positioned along the chord and span of each blade 14. The example cavity 22 is orientated within the blade 14 at a compound angle including a first angle 30 relative to the blade chord, and a second angle 32 relative to span of the blade. The resulting overall length of the cavities 22 corresponds to the targeted noise frequency. Further, each of the blades 14 can include cavities 22 of different lengths to target several different noise frequencies for attenuation.

The example propfan assembly 10 reduces overall acoustic emissions by attenuating the most prevalent frequencies. Further, the structure of each blade 14 reduces the amount of noise that is generated. The cavities 22 disposed within the blades 14 reduce unsteady pressures on each of the blades 14 that generate the acoustic energy. The reduced noise that is generated is then attenuated by the internal features of each blade 14.

Each individual blade 14 will attenuate noise generated by adjacent blades during rotation. In other words, one blade 14 will attenuate noise generated by the preceding blade. Further, for propfan assemblies that include multiple rows of blades 14, a rearward row of blades 14 will attenuate noise generated in the forward row of blades.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A propfan assembly comprising:
   a plurality of blades;

at least one inner cavity within each of the plurality of blades, wherein the at least one inner cavity extends longitudinally a length greater than a thickness of a corresponding one of the plurality of blades;

a plurality of openings within each of the plurality of blades for communicating noise energy with the at least one inner cavity; and a noise attenuation structure disposed within the inner cavity.

2. The assembly as recited in claim 1, wherein the plurality of openings are disposed on at least one of a pressure side and a suction side of each of the plurality of blades.

3. The assembly as recited in claim 1, wherein each of the plurality openings comprises an area determined to limit disruption of airflow over each of the plurality of blades.

4. The assembly as recited in claim 1, wherein the inner cavity includes a length that corresponds with a frequency of noise to be attenuated.

5. The assembly as recited in claim 1, wherein the noise attenuation structure comprises a honeycomb structure.

6. The assembly as recited in claim 1, including a plurality of inner cavities within each of the plurality of blades.

7. A blade configured for rotation about an axis for a propfan assembly comprising:

an internal cavity disposed within the blade, wherein the internal cavity extends longitudinally a length greater than a thickness of the blade, a plurality of openings within the blade that communicate noise energy with the internal cavity; and a noise attenuation structure disposed within the internal cavity.

8. The assembly as recited in claim 7, wherein the noise attenuation structure includes a honeycomb structure disposed within the internal cavity.

9. The assembly as recited in claim 7, wherein the plurality of openings comprise openings of an area determined to limit disruption of airflow over the blade.

10. The assembly as recited in claim 7, wherein the internal cavity includes a length corresponding with a desired noise frequency.

11. The assembly as recited in claim 7, wherein the plurality of openings are disposed on at least one of the pressure and suction sides of blade structure.

\* \* \* \* \*